United States Patent [19]
Allen et al.

[11] 4,428,182
[45] Jan. 31, 1984

[54] GRAIN HANDLING ARRANGEMENT FOR AN ARTICULATED COMBINE

[75] Inventors: James R. Allen, Bettendorf, Iowa; LaVerne Anderson, Jr., New Windsor; Daniel L. Leemans, Moline, both of Ill.

[73] Assignee: Deere & Company, Moline, Ill.

[21] Appl. No.: 371,047

[22] Filed: Apr. 23, 1982

[51] Int. Cl.³ .................... A01F 12/46; A01D 41/00
[52] U.S. Cl. .................................. 56/14.6; 56/16.6; 414/343; 414/526; 280/492
[58] Field of Search ............... 56/10.1, 14.5, 14.6, 56/16.6, 122, 125, DIG. 14; 198/312; 180/235; 414/340, 343, 345, 526; 280/492; 130/DIG. 2

[56] References Cited

U.S. PATENT DOCUMENTS

| | | | |
|---|---|---|---|
| 2,268,090 | 8/1966 | Wirkkala | 212/7 |
| 3,532,237 | 10/1970 | Anderson | 414/526 |
| 3,680,291 | 8/1972 | Soteropulos | 56/14.6 |
| 4,286,530 | 9/1981 | Couley | 414/526 |
| 4,290,622 | 9/1981 | Horvath | 280/492 |
| 4,317,326 | 3/1982 | Riedinger | 56/14.6 |

*Primary Examiner*—Gene Mancene
*Assistant Examiner*—John Weiss

[57] ABSTRACT

In an articulated combine, the hinge arrangement connecting the front and rear bogies consists of spaced-apart upper and lower links. The lower link construction provides for oscillation between the bogies as well as establishing a steering pivot center. The upper link normally lies in a fore-and-aft plane and is pivotally connected between rearward upper portions of the respective bogies, thus spanning the length of the rear bogie. The hinge arrangement also provides part of the structure for a conveyor for conveying clean grain between the front and rear bogies. In one embodiment, the upper link comprises an auger tube into which clean grain is introduced by a clean grain elevator and cross auger. In another embodiment, the lower link assembly does double duty as an auger conveyor housing.

30 Claims, 7 Drawing Figures

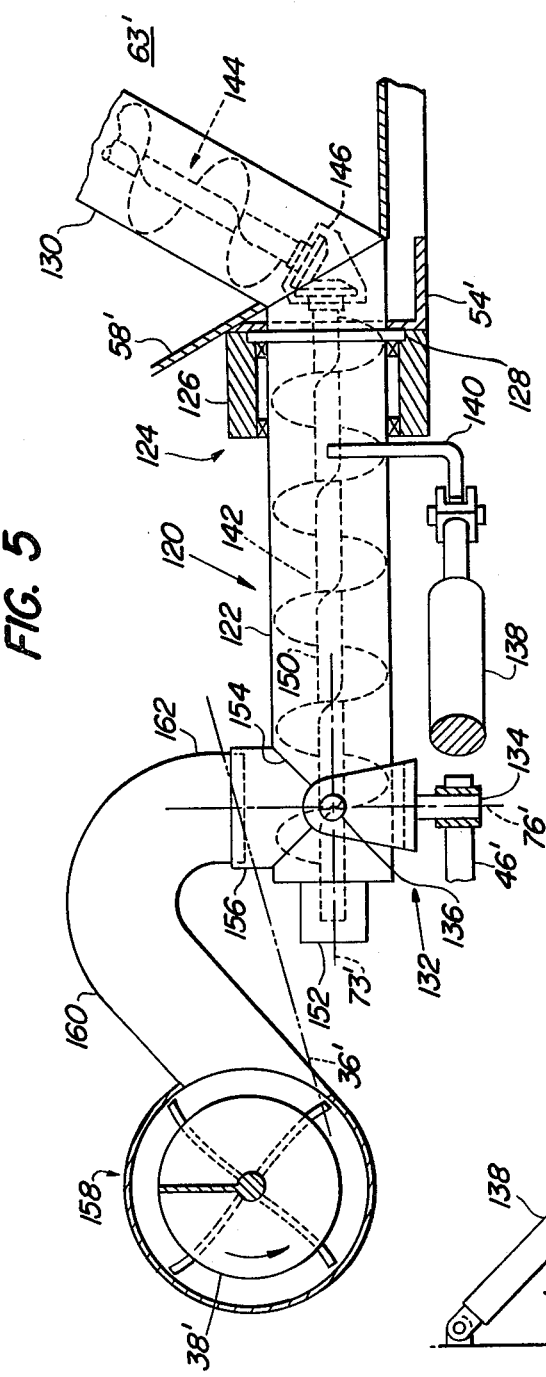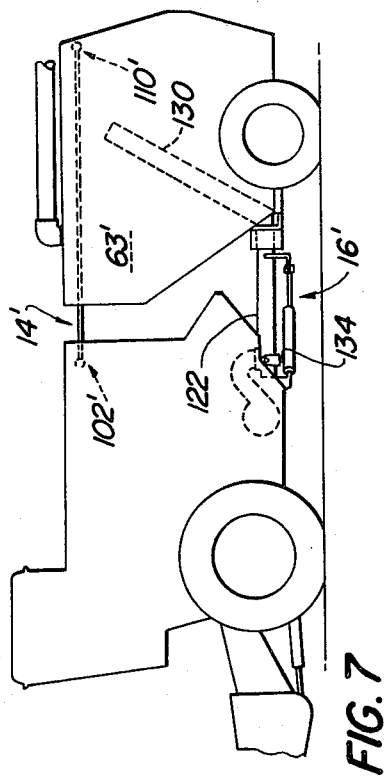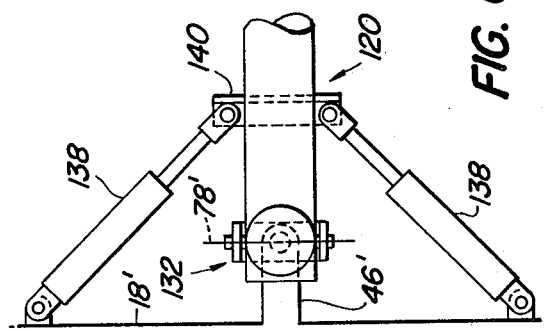

regardless of the alignment of the bogies. Thus, special single purpose construction to allow for relative movement between components of the conveyor system is unnecessary.

In keeping with the invention, the forward pivot center of a transfer conveyor link may be substantially in vertical alignment with the steering or hitch pivot center of the combine. Also, in keeping with the invention, any one of a number of generally conventional means may be used for collecting clean grain from a cleaning shoe and transferring it to the "conveyor link" between front and rear bogies. These may include having a cross auger of the cleaning shoe feed a slinger and chute arrangement for direct feeding to the conveyor link; or a generally conventional clean grain elevator may deliver to an upper conveyor link by means of a transverse auger in an upper portion of the front bogie.

A feature of the invention is that it facilitates an articulated combine configuration having a cleaning shoe in the front bogie and making it possible for the rear bogie to be devoted entirely to grain receiving and transporting, the rear bogie preferably having its own unloading means.

With a conveyor or transfer link between the bogies according to the invention, advantages of the articulated configuration including relatively greater maneuverability and stability than rigid chassis machines are undiminished. If a portion of the hinge arrangement between the bogies does double duty as a conveyor, there is an obvious potential for reduced cost and increased simplicity of manufacture as well as an improvement in appearance because of the generally simpler structure.

BRIEF DESCRIPTION OF THE DRAWINGS

FIG. 5 is an enlarged partial semi-schematic side view of an alternative embodiment in which the lower connecting link between the bogies of the combine serves also as a conveyor.

FIG. 6 is an overhead partial view of the steering arrangement of the embodiment of FIG. 5.

FIG. 7 is a reduced and simplified side view of a combine with the embodiment of FIG. 5.

DESCRIPTION OF THE PREFERRED EMBODIMENTS

Figure 1:
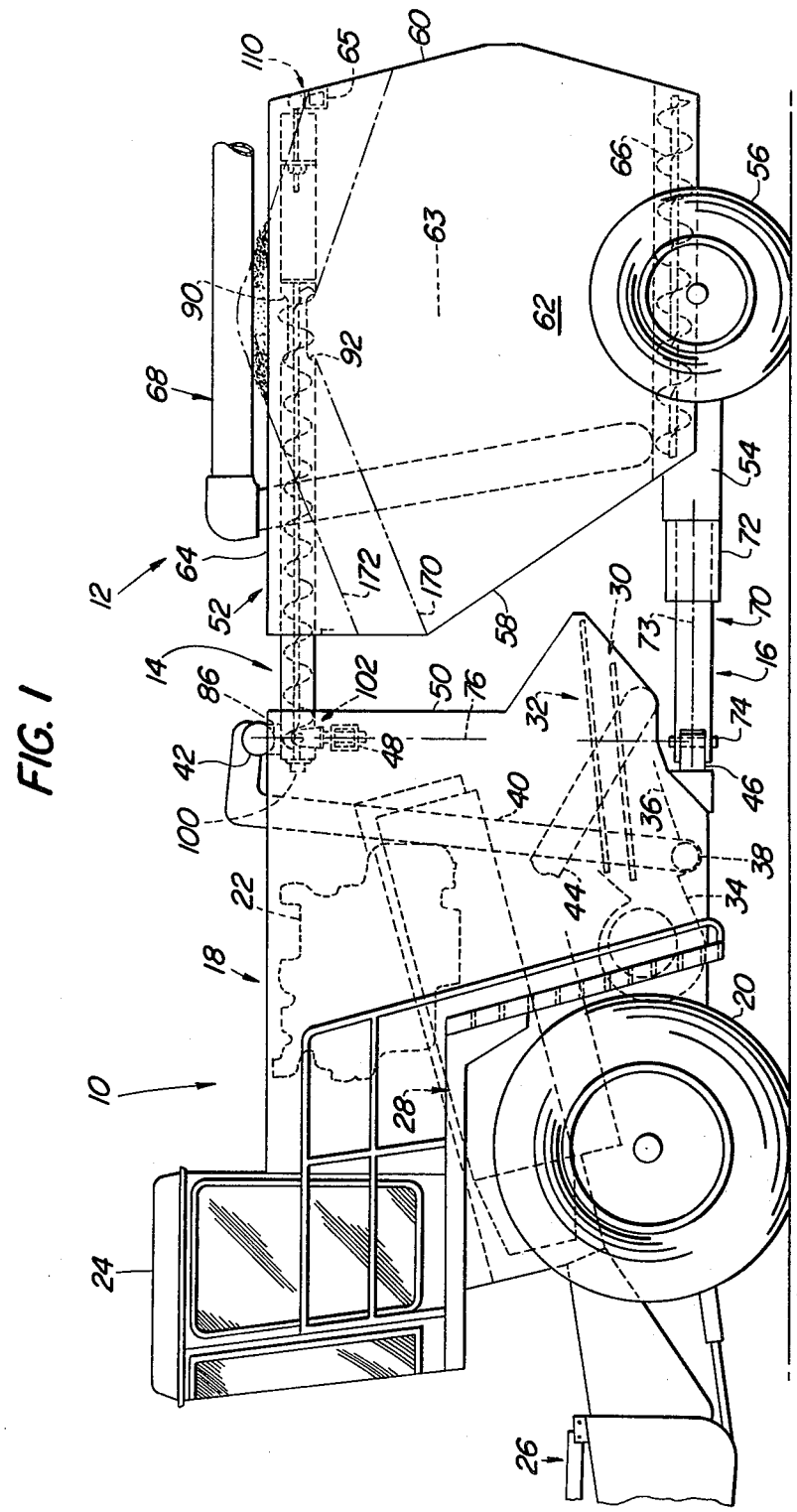
FIG. 1 is a semi-schematic left-hand side elevation of an articulated combine embodying the invention.
Figure 2:
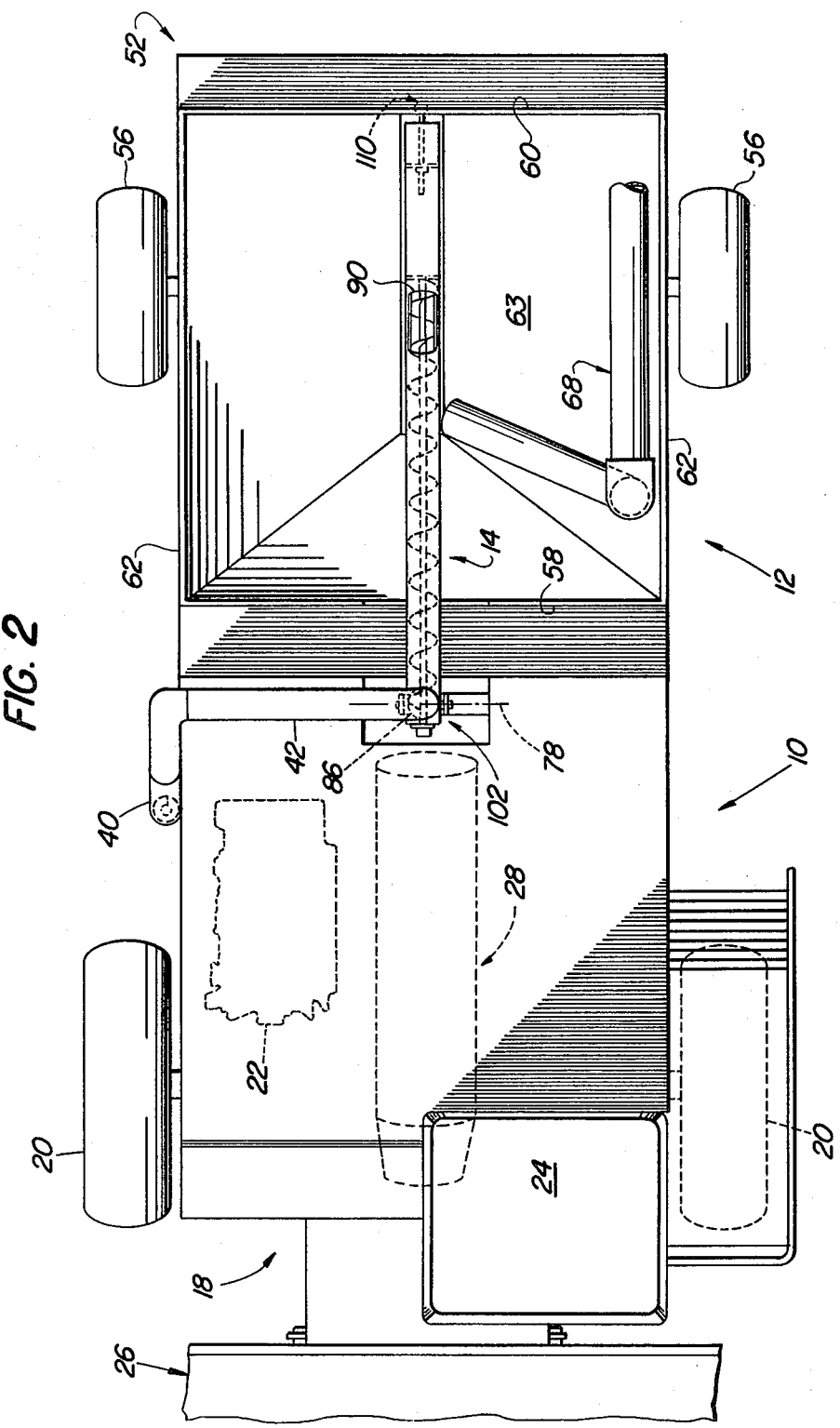
FIG. 2 is an overhead semi-schematic view of the combine.

An exemplary embodiment of the invention is illustrated in the articulated combine of FIGS. 1 and 2. A combine of this general type has been described in some detail in U.S. patent application Ser. No. 020,863 now U.S. Pat. No. 4,317,326 and only a brief description of the general structure and functions of such a machine need be given here.

Front and rear bogies 10 and 12 respectively are connected by a hinge arrangement including upper and lower links 14 and 16, respectively. The main body 18 of the front bogie 10 is supported above the ground on a pair of laterally spaced wheels 20. Power for the entire machine comes from an engine 22 mounted toward the right-hand side of the body 18 and the combine is controlled from an operator's station 24.

As the machine advances over a field, a harvesting header 26 shown partially only in FIG. 1, gathers and delivers crop material to a generally fore-and-aft oriented axial flow rotary separator 28. Separated grain and chaff is delivered to a cleaner 30 in a conventional way and straw is discharged upon the ground (not shown). The header 26, separator 28 and cleaner 30 are all included in the front bogie 10.

The cleaner 30 is generally conventional and includes a pair of sieves 32 "fluidized" by air from a blower 34. A collecting floor 36 diverts cleaned grain to a clean grain cross auger 38 from whence a clean grain elevator 40 carries it upwards to a short transverse auger 42 which delivers it to the upper rear center portion of the front bogie 10. Tailings are returned for rethreshing by tailings return elevator 44 shown partially only in FIG. 1. A drawbar 46, connected rigidly to the body 18 extends rearwardly from a lower central portion of the front bogie 10. The body 18 also includes a transverse rear upper frame member 48 carried adjacent a rear wall 50 of the body 18.

In the rear bogie 12, the body 52 is supported on a chassis or frame 54 in turn supported above the ground by a pair of laterally spaced wheels 56. The front and rear walls 58 and 60 respectively and the opposite side walls 62 define a grain tank 63, a large grain receiving and holding receptacle occupying virtually the entire body 52 of the rear bogie, its upper limit being defined by the top 64 of the side walls 62. A transversely extending frame member 65 is carried towards the upper edge of the rear wall 60. Unloading of grain from the tank 64 is conventional, by means of bottom collecting auger 66 and swingable unloading auger assembly 68.

The lower link 16 includes a fore-and-aft extending tongue assembly 70 carried in fixed directional relationship to the chassis 54 of the rear bogie by a swivel arrangement 72 at its rearward end. The swivel permits relative rotation between the tongue assembly 70 and the rear bogie body 52 about a longitudinal or fore-and-aft axis 73. The tongue assembly 70 is coupled or hitched to the draw bar 46 of the front bogie 10 by a hitch pin 74, the coupling permitting pivoting between front and rear bogies about an upright axis 76 and containing enough play or looseness to permit limited relative pivoting about a transverse axis 78 through the coupling.

Figure 3:
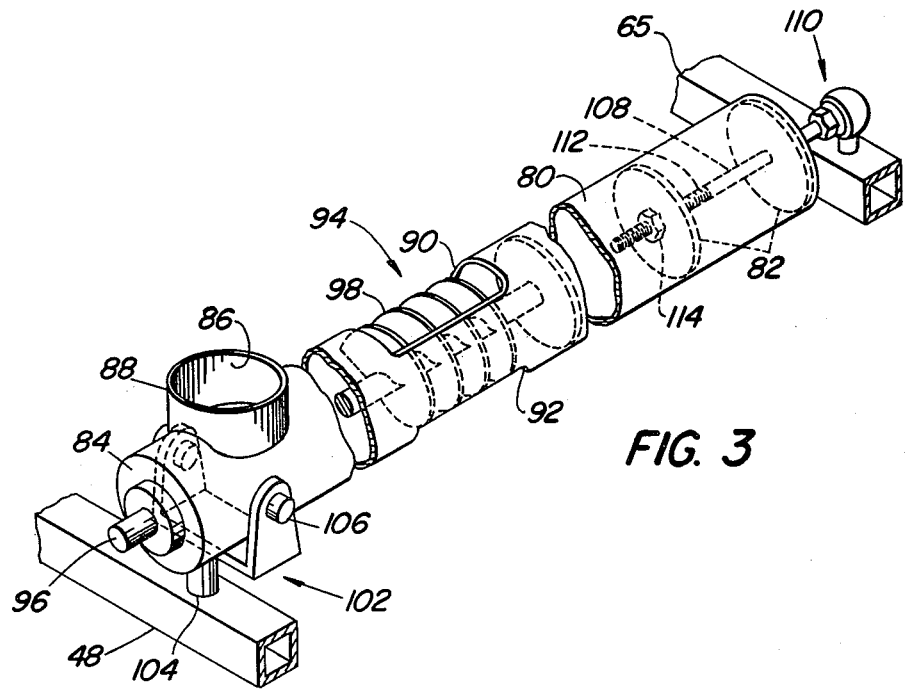
FIG. 3 is an enlarged partial left-hand front three-quarter perspective view of the dual purpose member serving as both an upper connecting link between the bogies of the combine and also as a conveyor for transferring clean grain between them.

Turning now to the upper connecting link 14 and referring particularly to FIG. 3, we note that structurally it consists principally of an elongated tube 80 which also serves as an auger housing. The rearward end of the tube is closed by a pair of spaced bulkheads 82 and at the front by a bulkhead or cap 84. At the forward end of the tube 80, an upwardly facing inlet 86 is bounded by a generally cylindrical wall 88. Disposed towards the rear of the tube 80 and so as to be approximately over the center of the tank 64 are a pair of vertically opposite upper and lower discharge openings 90 and 92 respectively. The tube 80 houses an auger assembly 94, rotatably supported in the tube by auger shaft 96 and including auger flighting 98 extending from the upstream end adjacent the inlet 86 to just beyond the outlets 90, 92. A hydraulic motor 100 (FIG. 1) drives the auger through the forward end of the shaft 96.

GRAIN HANDLING ARRANGEMENT FOR AN ARTICULATED COMBINE

CROSS REFERENCES TO RELATED APPLICATIONS

U.S. Patent application Ser. No. 371,046 filed Apr. 23, 1982 simultaneously herewith in the names of Hagstrom et al, entitled COMBINE HARVESTER WITH HEADER MOUNTED SEPARATOR and assigned to the assignee of the invention herein, is directed in a preferred embodiment to a combine harvester in which the header includes an axial flow rotary separator including threshing and separating portions mounted immediately rearward of the header gatherer portion, and in which separated grain and chaff is delivered by way of a feederhouse to a cleaning shoe carried in the body of the combine. In one embodiment, the combine body is articulated and the cleaning shoe is carried in the forward bogie. To the extent that the invention disclosed and claimed in Application Ser. No. 371,046, filed Apr. 23, 1982, is disclosed herein, it is done so only for completeness of description of the operative environment of the invention claimed herein and thus forms no part of the invention claimed herein.

U.S. Pat. No. 4,414,794 filed simultaneously herewith in the name of Riedinger, entitled HINGE ARRANGEMENT FOR AN ARTICULATED COMBINE and assigned to the assignee of the invention herein, is directed in a preferred embodiment to an articulated combine having a hinge arrangement including spaced apart upper and lower links, the upper of which extends from the rear of the front bogie to the rear of the rear bogie. To the extent that the invention disclosed and claimed in Application Docket No. 8143 is disclosed herein, it is done so only for completeness of description of the operative environment of the invention claimed herein and thus forms no part of the invention claimed herein.

BACKGROUND OF THE INVENTION

This invention concerns articulated harvesters and, more particularly, means for conveying crop material between the bogies of such harvesters.

The broad concept of the articulated harvester has a number of potential advantages over rigid frame machines. These advantages, such as improved stability and maneuverability, may be realized in various configurations. For example, the optimum distribution of functional units between front and rear bogies may vary according to such considerations as size and capacity of the vehicle and crops to be handled. In any case, there is a need for efficient means of transferring crop material between the bogies of the harvester.

The present invention is applicable to handling a range of crop materials in a variety of articulated harvester configurations. However, for convenience, except as otherwise noted, the discusion here will be limited to a particularly appropriate exemplary application—that of transferring a grain and chaff mix or clean grain from a front bogie to a grain handling means such as a grain tank or cleaning shoe in the rear bogie of an articulated combine.

Means for handling clean grain in combines with conventional chassis (not articulated) are well known. Typically, a cleaning shoe is disposed below a grain tank; a cross auger collects clean grain from the sieves of the shoe and an elevator takes it up into the tank. U.S. patent application Ser. No. 020,863 now U.S. Pat. No. 4,317,326 Riedinger, also assigned to the assignee of the present invention and covering an articulated combine, discloses a similar general arrangement for handling cleaned grain except that the entire arrangement is embodied in the rear bogie of an articulated combine. Riedinger also discloses a slinger arrangement for transferring a mixture of grain and chaff from a separator in the front bogie to the cleaner in the rear bogie. But this is an arrangement of limited applicability which does not take advantage of the particular nature of the articulated configuration.

SUMMARY OF THE INVENTION

Accordingly, an object of the invention is to provide in a harvester such as an articulated combine, means for transferring crop material such as clean grain or grain and chaff mixture between front and rear bogies that is compatible with and does not diminish the potential advantages of the articulated configuration.

Another object of the invention is to make at least a portion of the structural connection between bogies dual purpose—that is to say to be functional as well as structural. Thus a portion of the hinge or connecting structure may also serve as a conveying structure or housing.

Another object of the invention is to provide an improved crop transfer arrangement, the function of which is substantially unaffected by oscillation or by change in the steering angle between the bogies.

Another object of the invention is to provide in an articulated combine, a crop material transfer conveyor which is pivotally connected at its opposite ends to the front and rear bogies respectively so as to remain functional and not impede articulation movement of the vehicle resulting from steering and oscillation between the bogies while traversing uneven ground.

A more particular object is to provide in an articulated combine having a cleaning shoe in the front bogie, an efficient means of collecting and transferring clean grain from the cleaning shoe to a cleaned grain receiving means in the rear bogie.

In one embodiment, a tongue-like structural load carrying member connecting rear bogie to front bogie comprises an elongated hollow member doubling as a conveyor housing, for conveying clean grain rearwardly into a grain receptacle of the rear bogie, making a conventional clean grain elevator unnecessary.

In another embodiment, the combine hinge arrangement includes an elongated upper link, also comprising an elongated hollow member doubling as a conveyor housing and pivoted at both ends. In this arrangement, the link may extend to be pivotally connected at the rear of the body of the rear bogie and disposed vertically so that, especially if the link is laterally centered and extends fore-and-aft, grain discharged from one or more openings along its length, may fill the grain tank or receptacle with self-leveling effect.

In these embodiments, where portions of the hinge arrangement double as material conveyors (conveyor links) and the hinge members are pivotally connected to the front bogie for pivoting at least about an upright axis, the conveyor may be provided with an inlet approximately vertically aligned with a pivot center on the upright axis so that relative movement between conveyor sections at a transfer point is minimized and material may be transferred from front to rear bogies The pivot center of the coupling of the upper link 14 to the front bogie 10 is defined by a trunion assembly 102 pivoting about a vertical axis on pin 104 carried in the upper frame member 48 vertically above the hitch pin 74. The auger tube 80 is carried on opposite transversely mounted coaxial pins 106. This trunion coupling provides for relative pivoting between the bogies on upright and transverse axes. The coupling of the rear end of the auger tube 80 to the rear bogie 12 includes a support shaft 108 carried by the bulkheads 82 coaxially with the auger tube 80 and modified at its rearward end to become part of a ball and socket assembly 110 carried by the rear bogie upper frame member 65. A threaded portion 112 of the shaft 108 and nuts 114 provide for adjustment of the overall length of upper connecting link 14. Collectively, the coupling of front and rear bogies just described provides for universal relative pivoting movement between them including oscillation about the fore-and-aft axis 73 as well as pivoting on the upright steering axis 76 and the transverse axis 78 passing through the hitch (drawbar 46, hitch pin 74), which may also be regarded as a steering pivot center.

In an alternative embodiment of the invention, the general configuration of the combine remains the same, as indicated in FIG. 7. Now, however, the upper link 14' is in the form of a simple structural member and, as best seen in FIG. 5, a lower link 16', connecting the bogies, also serves as a conveyor. A tongue assembly 120 includes a fore-and-aft extending tube or housing 122 rotatably mounted in a swivel assembly 124 which includes a swivel housing or casing 126 rigidly carried by the frame 54' of the rear bogie. A thrust flange 128 retains the tube 122 in the swivel assembly 124. An inclined tube 130 extends rearwardly and upwardly into the grain tank 63' communicating with and forming an extension of the horizontal tube portion 122.

A trunion assembly 132 couples the tube 122 and hence the rear bogie to the front bogie at draw bar 46'. Vertical and horizontal pins 134 and 136, respectively provide for relative pivoting about upright and transverse axes 76', 78' while the swivel assembly 124 permits oscillation between front and rear bogies about a fore-and-aft axis 73'.

A pair of hydraulic cylinders 138, seen best in FIG. 6, connected between the frame or body of the front bogie 18' and a bracket 140 rigidly attached to and extending downwards from the tube 122, serve as steering actuators. A conventional hydraulic system (not shown) provides necessary hydraulic power and controls. A similar steering arrangement may be used in the embodiment of FIGS. 1 and 2 but is not shown in those figures. Preferably the mechanical connections of the cylinders are ball jointed to accommodate changes in their alignment as the bogies oscillate and kneel.

The alternative lower conveyor link assembly (FIG. 5) is completed by coupled horizontal and inclined screw conveyor assemblies, 142 and 144 respectively, drivingly connected by an enclosed bevel gear case 146. A central shaft 150 of the horizontal auger assembly 142 extends forward from the tube 122 to be coupled with and driven by a hydraulic motor 152. A generally circular upwardly facing opening 154 in the tube 122, bounded by a generally cylindrical wall 156, forms an inlet for material from the conveyor link. This inlet is vertically aligned with or coaxial with the steering or upright pivot axis 76' defined by the pin 134 of the trunion assembly 132. It therefore provides an essentially stationary receiving inlet for grain transferred from the cleaner by an impeller 158 coaxial with the clean grain auger 38' by way of deflector chute 160 which has a generally circular outlet 162 aligned with the inlet 154.

In operation, the gathering, feeding, threshing and separating of crop material and the delivery of grain and chaff mixture from the separator to the cleaner 30 is all conventional. Also in the embodiment shown in FIGS. 1, 2 and 3, the transfer of clean grain from the cleaner to the discharge from the upper transverse auger 42 is also generally conventional, the discharge from the upper cross auger 42 corresponding to delivery of clean grain to a grain tank in a conventional fixed chassis combine. However, in this case, the discharge is into the inlet 86 of the top link assembly 14 and engagement by the transfer auger assembly 94 for conveying or transfer across the hinge area of the combine to the rear bogie and discharge into the grain tank 63.

The operation of the embodiment shown in FIGS. 5 and 7 is also generally conventional up to the delivery of clean grain to the clean grain cross auger 38'. The auger 38' delivers clean grain to the impeller 158 rather than as is conventional to an upright clean grain elevator. The chute 160 deflects grain discharged by the impeller 158 down into the inlet 154 of the lower link transfer conveyor assembly. Then the conveyor augers 142, 144 carry the cleaned grain into the grain tank 63'. Discharge from the inclined portion of the screw conveyor (130, 144) is in the well-known fountain mode in approximately the center of the tank as indicated in FIG. 7.

Figure 4:
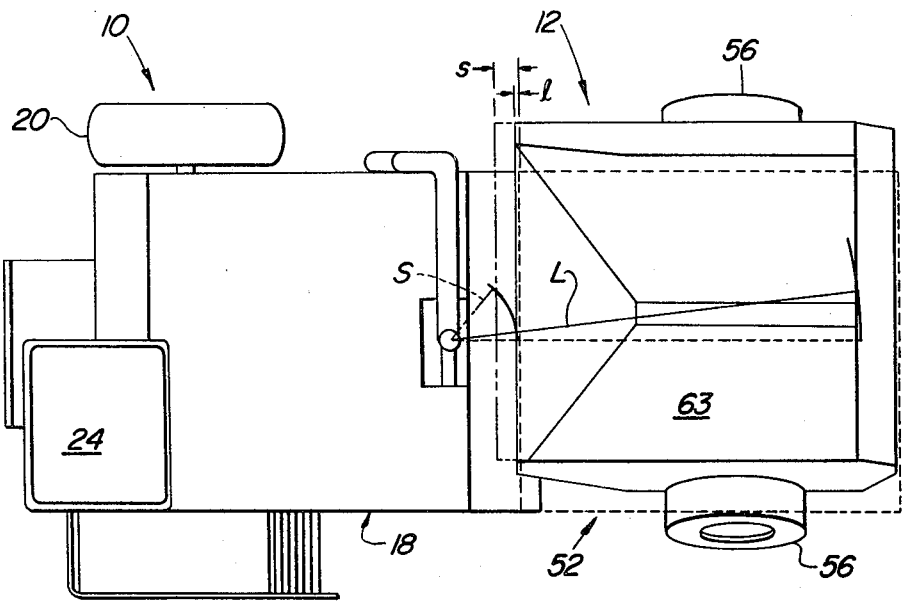
FIG. 4 is a simplified and reduced overhead schematic view of the combine comparing the "kneeling" effect of longer and shorter upper connecting links.

As the combine traverses uneven ground, there is oscillation between the front and rear bogies with relative lateral displacement between upper portions of the bogies as indicated in FIG. 4 which compares the foreshortening and kneeling or tipping effect of short and long upper links S and L respectively for similar lateral displacement of the rear bogie relative to the front.

The dual purpose upper connecting link/transfer conveyor 14 is preferably disposed, as in this embodiment (FIGS. 1 and 2), in a fore-and-aft centerline plane of the combine. This aids in vehicle stability and is more efficient in that the discharge into the grain tank (openings 90, 92) remains essentially in the center of the tank. Oscillation between the bogies does of course cause some swinging of the conveyor link and hence relative movement of the openings 90, 92 but as can be seen (FIG. 4 particularly), these are relatively minor and in any case, in normal operation, oscillation will take place in both directions so that relative movement of the discharge openings of the conveyor auger will tend to cancel each other so that the grain tank is still filled evenly. Single somewhat elongated openings such as those illustrated here (90, 92), have a self-levelling effect tending to fill and heap the tank 63, initially somewhat as indicated at 170 in FIG. 1, until the downward opening 92 is partially submerged by grain or, as indicated at 172 for the upward opening 90.

It can be seen that using either the upper or lower connecting link assemblies in an articulated combine for transfer of crop material between the bogies provides a simple convenient and efficient method of material handling. Use of one of the links as a conveyor in no way diminishes or inhibits the function of that link as a structural tie or link between the bogies. Hence the advantages of articulation remain fully available even when one of the links is used as a conveyor.

By locating the conveyor inlet on the steering axis, the need for special conveyor structure designed to accommodate relative movement is avoided. A simple intermediate conveyor (cross auger 42 in FIG. 1 or impeller 58 and chute 160 in the embodiment of FIG. 5) in combination with conventional simple conveyor inlets (86 and 154 respectively) may be used to feed the transfer conveyor. Reception of crop material into these conveyors is not significantly affected by relative movement between components at the inlets caused by oscillation or changes in steering angle between the bogies. A particular advantage of the lower link transfer (embodiment of FIG. 5) is the overall simplification and potential cost reduction resulting from the elimination of the vertical clean grain elevator 40 and upper cross auger 42 and their replacement by the simpler impeller conveyor arrangement (158, 160) and inclined auger extension (130, 144).

Neither embodiment requires any additional leveling means for filling the grain tank (63, 63'). However, in the embodiment of FIG. 1, only a single set of discharge openings (90, 92) from the upper link transfer auger assembly is shown. Obviously these openings could be longer or duplicated, for example to suit a longer or larger grain tank.

An advantage of a particular configuration according to the invention in which, with the cleaner is located in the front bogie, is that the rear bogie may become essentially a grain cart, the only moving parts of which are the unloading auger system (68). The simplicity and relatively low cost of manufacture of such a rear bogie makes it more feasible to offer more than one rear bogie size in a given product line.

As indicated in FIGS. 5 and 7, the bottom link grain transfer arrangement is quite compatible with an articulated combine hinge arrangement consisting of spaced apart upper and lower links (14' and 16' respectively). However, it will be obvious that with a suitable gudgeon coupling replacing the trunion arrangement shown (132), the upper link could be dispensed with and lower link grain transfer could be used in a single link hinge arrangement. It will also be clear that an articulated harvester might include a transfer conveyor of the same general type as that of FIG. 1 but serving purely as a conveyor. However, such an arrangement is unlikely to be as cost-effective as that exemplified by the present embodiments.

The potential for reduction of cost, simplicity of structure and improved overall appearance of harvesters embodying the invention will be apparent from these exemplary embodiments in which a portion of the hinge arrangement, connecting front and rear bogies of an articulated combine, does duty as a conveyor for transferring crop material from front to rear bogies as well as providing a structural function as a hinge member.

We claim:

1. An articulated harvester comprising:
    a front bogie including a body supported above the ground on laterally spaced wheels disposed so as to permit tipping of the bogie relative to the ground about a transverse axis and including means for gathering a crop from the field and at least partially processing it and delivering a first portion of crop material to an outlet of the front bogie;
    a rear bogie including a body supported above the ground on laterally spaced wheels disposed so as to permit tipping of the bogie relative to the ground about a transverse axis and including a crop material receiving means;
    means for connecting the bogies in tandem so as to control relative tipping between them and including at least one hinge member defining at least one pivot center and permitting relative pivoting between the bogies about upright and fore-and-aft axes both passing through the pivot center;
    means for receiving crop material from the outlet of the front bogie and transferring it to the receiving means of the rear bogie and including a conveyor portion coextensive with a hinge member of the connecting means; and
    power means carried by the harvester and operable to pivot the bogies one relative to the other about the upright axis for steering the harvester.

2. An articulated crop harvester comprising a front bogie including means for gathering a crop from a field and crop processing means for at least partially processing it, a rear bogie including a crop receiving means, a hinge arrangement connecting the front and rear bogies and defining spaced apart forward and rearward pivot centers in fixed positional relationship to each of the front and rear bogies respectively and permitting pivoting between the bogies about upright and fore-and-aft axes and means for transferring crop material from the crop processing means of the front bogie to the crop receiving means of the rear bogie characterized in that the crop material transfer means includes an elongated conveyor assembly pivotally connected adjacent at least one of its opposite ends to one of the bogies.

3. The harvester of claim 2 further characterized in that the conveyor assembly is pivotally connected adjacent both its opposite ends to the front and rear bogies respectively.

4. The harvester of claim 3 further characterized in that the hinge arrangement comprises upper and lower portions and the conveyor assembly, at least partially, defines the upper portion.

5. The harvester of claim 4 further characterized in that the lower portion of the hinge arrangement includes means for connecting the rear bogie to the front bogie so that it may pivot universally with respect to the front bogie about a hitch pivot center and the connection of the conveyor assembly to the front bogie defines said forward pivot center and said center is in approximate vertical alignment with the hitch pivot center.

6. The harvester of claim 4 further characterized in that the conveyor assembly includes an outlet forward of the pivotal connection of the conveyor assembly to the rear bogie.

7. The harvester of claim 4 further characterized in that the conveyor assembly substantially spans the fore-and-aft extent of the rear bogie.

8. The harvester of claim 7 further characterized in that the conveyor assembly includes an outlet for discharging crop material in an upper central portion of the rear bogie.

9. The harvester of claim 2 further characterized in that the conveyor assembly includes an upwardly facing inlet and the transfer means further includes an intermediate conveyor for transferring crop material from the crop processing means to the conveyor assembly inlet.

10. The harvester of claim 9 further characterized in that the inlet is in approximate vertical alignment with the forward pivot center.

11. The harvester of claim 2 further characterized in that the conveyor assembly comprises an auger conveyor including a tubular housing constituting a principle structural member of the hinge arrangement.

12. An articulated combine comprising:
a front bogie including a body supported above the ground on laterally spaced wheels and carrying a forward mounted harvesting header for gathering crop material from a field, separating means and a cleaning shoe having a clean grain delivery means so that as the combine advances over the field, crop material is gathered, transferred to the separator for threshing and separating and delivering separated grain and chaff to the cleaning shoe for cleaning and delivery of clean grain to the clean grain delivery means;
a rear bogie including a body supported above the ground on laterally spaced wheels and including a grain tank for receiving and holding clean grain;
hinge means for coupling the front and rear bogies together in tandem so as to permit relative movement between them including pivoting about an upright axis and oscillation about a generally fore-and-aft axis and including at least one elongated hinge member; and
clean grain transfer means for receiving clean grain from the clean grain delivery means of the cleaning shoe and transferring said grain to the grain tank of the rear bogie and including a conveyor portion coextensive with said elongated hinge member.

13. The combine of claim 12 wherein the hinge means includes upper and lower portions each including hinge members and the conveyor portion is coextensive with a hinge member of the upper portion.

14. The combine of claim 12 wherein the hinge has upper and lower portions each including hinge members and the conveyor portion is coextensive with a hinge member of the lower portion.

15. An articulated combine harvester having a front bogie including means for gathering a grain crop from a field and threshing and separating grain from the crop and means for cleaning the grain and clean grain conveyor means for receiving clean grain from the cleaning means and delivering it to an outlet, a rear bogie including means for receiving clean grain from the front bogie, hinge means, including a conveyor link, for pivotally and structurally connecting the rear bogie to the front bogie and permitting pivoting of the rear bogie relative to the front bogie about an upright axis and oscillation relative to the front bogie about a fore-and-aft axis, steering means for effecting relative pivoting about the upright axis for steering the harvester, and means for conveying clean grain from the clean grain outlet of the front bogie to the rear bogie wherein the conveyor link includes a conveyor housing providing at least a portion of the structure of the hinge means and at least a portion of the means for conveying grain from the clean grain outlet to the rear bogie.

16. The combine harvester of claim 15 wherein the hinge means includes spaced apart upper and lower portions and the conveyor link is included in the upper portion.

17. The combine harvester of claim 15 wherein the hinge means includes spaced apart upper and lower portions and the conveyor link is included in the lower portion.

18. The combine harvester of claim 17 wherein said conveyor housing is tubular and generally horizontal and the conveyor link further includes a screw conveyor portion extending within the housing, said housing being pivotally connected to the forward bogie at its forward end, said connection defining a hitch pivot center, and connected in a fixed directional relationship to the rear bogie at its rearward end.

19. The combine harvester of claim 18 wherein the upper portion of the hinge means comprises an elongated link pivotally connected at its opposite ends respectively to the front and rear bogies.

20. The combine harvester of claim 20 wherein the housing includes an upwardly facing inlet opening in approximate vertical alignment with the hitch pivot center and in a receiving relationship with the outlet of the clean grain conveyor means.

21. The combine harvester of claim 20 wherein the clean grain conveyor means includes a transverse clean grain auger and an impeller in a receiving relationship with said auger and a clean grain deflector chute having an inlet in a receiving relationship with the impeller and an outlet comprising said clean grain conveyor means outlet in a delivery relationship with the inlet of the housing of the conveyor link, for transferring clean grain from the clean grain auger to the conveyor link.

22. The combine harvester of claim 18 wherein the conveyor link includes a rearwardly and upwardly extending conveyor extension portion communicating with the end of the conveyor housing extension portion for transferring grain rearwardly and upwardly to the clean grain receiving means.

23. The combine harvester of claim 22 wherein the conveyor link includes swivel means connecting the conveyor extension portion to the horizontal conveyor housing portion and providing a swivel coupling so that the rear bogie may oscillate about a fore-and-aft axis relative to the front bogie.

24. The combine harvester of claim 22 wherein the grain receiving means comprises a grain tank and the conveyor extension portion extends into the grain tank.

25. The combine harvester of claim 18 further characterized in that the steering means includes an actuator connected between the front bogie and the conveyor housing and operable to swing the conveyor housing relative to the front bogie for steering the combine.

26. An articulated combine harvester having a front bogie including means for gathering a grain crop from a field and for threshing, separating and cleaning grain from the crop material and delivering it to a clean grain conveyor having an outlet, a rear bogie including a grain tank for receiving cleaned grain and an unloading conveyor for discharging grain from the tank, a hinge arrangement connecting the front and rear bogies and permitting pivoting between the bogies about upright and fore-and-aft axes and including spaced apart upper and lower portions and transfer means for conveying clean grain from the clean grain conveyor outlet to the grain tank characterized in that the upper portion of the hinge arrangement includes at least part of the clean grain transfer means.

27. The combine harvester of claim 26 wherein the upper portion of the hinge arrangement comprises an elongated, normally fore-and-aft extending link disposed in the upper portions of the respective bogies and pivotally connected at its opposite ends to the front and rear bogies respectively to define forward and rearward pivot centers respectively.

28. The combine harvester of claim 27 wherein the transfer means includes an auger conveyor having an upwardly directed inlet in a crop receiving relationship with the outlet of the clean grain conveyor and said inlet is in approximate vertical alignment with the front pivot center.

29. The combine harvester of claim 26 wherein the transfer means comprises an auger conveyor hving a tubular housing and including at least one discharge opening disposed centrally in an upper portion of the grain tank for controlling the filling of the tank.

30. An articulated combine comprising:
 a front bogie including a body supported above the ground on laterally spaced wheels and carrying a forward mounted harvesting header for gathering crop material from a field, separating means and a cleaning shoe having a clean grain delivery means so that as the combine advances over the field, crop material is gathered, transferred to the separator for threshing and separating and delivering separated grain and chaff to the cleaning shoe for cleaning and delivery of clean grain to the clean grain delivery means;
 a rear bogie including a body supported above the ground on laterally spaced wheels and including a grain tank for receiving and holding clean grain;
 hinge means for coupling the front and rear bogies together in tandem so as to permit relative movement between them including pivoting about an upright axis and oscillation about a generally fore-and-aft axis; and
 clean grain transfer means for receiving clean grain from the clean grain delivery means of the cleaning shoe and transferring said grain to the grain tank of the rear bogie and including a conveyor portion pivotally connected at its opposite ends to the front and rear bogies respectively.

* * * * *

UNITED STATES PATENT AND TRADEMARK OFFICE
CERTIFICATE OF CORRECTION

PATENT NO. : 4,428,182

DATED : 31 January 1984

INVENTOR(S) : James R. Allen, LaVerne Anderson, Jr., Daniel L. Leemans

It is certified that error appears in the above-identified patent and that said Letters Patent is hereby corrected as shown below:

Column 10, line 11, delete "20" and insert -- 18 --; line 28, before "end", insert -- rearward --; lines 40 and 41, delete "further characterized in that" and insert -- wherein --.

Column 11, line 6, delete "hving" and insert -- having --.

Signed and Sealed this

First Day of January 1985

[SEAL]

Attest:

GERALD J. MOSSINGHOFF

Attesting Officer     Commissioner of Patents and Trademarks